000
United States Patent
Stoppelmann et al.

(10) Patent No.: US 10,919,278 B2
(45) Date of Patent: Feb. 16, 2021

(54) FLEXIBLE MULTILAYER COMPRESSED-AIR LINE

(71) Applicant: EMS-PATENT AG, Domat/Ems (CH)

(72) Inventors: Georg Stoppelmann, Bonaduz (CH); Andre Sturzel, Igis (CH); Michael Hoffmann, Domat/Ems (CH)

(73) Assignee: EMS-PATENT AG, Domat/Ems (CH)

( * ) Notice: Subject to any disclaimer, the term of this patent is extended or adjusted under 35 U.S.C. 154(b) by 234 days.

(21) Appl. No.: 16/273,709

(22) Filed: Feb. 12, 2019

(65) Prior Publication Data
US 2019/0248120 A1    Aug. 15, 2019

(30) Foreign Application Priority Data
Feb. 13, 2018    (EP) .................................... 18156389

(51) Int. Cl.
*B32B 27/34* (2006.01)
*B32B 27/08* (2006.01)
(Continued)

(52) U.S. Cl.
CPC ............ *B32B 27/34* (2013.01); *B32B 1/08* (2013.01); *B32B 27/08* (2013.01); *B32B 27/18* (2013.01); *B32B 27/22* (2013.01); *F16L 11/04* (2013.01); *B32B 2250/03* (2013.01); *B32B 2250/24* (2013.01); *B32B 2250/40* (2013.01); *B32B 2270/00* (2013.01); *B32B 2274/00* (2013.01); *B32B 2307/308* (2013.01); *B32B 2307/4026* (2013.01); *B32B 2307/51* (2013.01); *B32B 2307/558* (2013.01); *B32B 2307/7242* (2013.01); *B32B 2307/734* (2013.01);
(Continued)

(58) Field of Classification Search
CPC ......... B32B 27/34; B32B 27/08; B32B 27/22; B32B 1/08; B32B 27/18; B32B 2250/03; B32B 2250/24; B32B 2307/558; B32B 2597/00; B32B 2274/00; B32B 2307/308; B32B 2270/00; B32B 2307/7242; B32B 2307/734; B32B 2307/4028; B32B 2605/08; B32B 2250/40; B32B 2307/51; B32B 2605/00; F16L 11/04
See application file for complete search history.

(56) References Cited

U.S. PATENT DOCUMENTS

2004/0096615 A1    5/2004    Manas-Zloczower et al.

FOREIGN PATENT DOCUMENTS

EP    1 378 696 A2    1/2004
EP    1 452 307 A1    9/2004
(Continued)

OTHER PUBLICATIONS

European Search Report for EP 18 15 6389 dated Apr. 6, 2018.

*Primary Examiner* — Michael C Miggins
(74) *Attorney, Agent, or Firm* — Sughrue Mion, PLLC

(57) ABSTRACT

Plastics line consisting of three layers, an inner layer (3) bordering the interior (2), a middle layer (4) directly adjoining the inner layer (3), and an outer layer (5) directly adjoining the middle layer (4), where
the inner layer (3) is formed on the basis of a mixture of at least two polyamides selected from the following group: PA12, PA612, PA616, or consists substantially thereof,
the middle layer (4) is formed on the basis of PA612 and/or PA616 or consists substantially thereof,
the outer layer (5) is formed on the basis of a mixture of at least two polyamides selected from the following group: PA12, PA612, PA616, or consists substantially thereof.

32 Claims, 1 Drawing Sheet

(51) Int. Cl.
*B32B 27/22* (2006.01)
*B32B 1/08* (2006.01)
*F16L 11/04* (2006.01)
*B32B 27/18* (2006.01)

(52) U.S. Cl.
CPC ....... *B32B 2597/00* (2013.01); *B32B 2605/00* (2013.01); *B32B 2605/08* (2013.01)

(56) References Cited

FOREIGN PATENT DOCUMENTS

| | | |
|---|---|---|
| EP | 1 717 022 A1 | 11/2006 |
| EP | 2 409 830 A1 | 1/2012 |
| EP | 2 842 736 A1 | 3/2015 |
| WO | 2011/136869 A1 | 11/2011 |

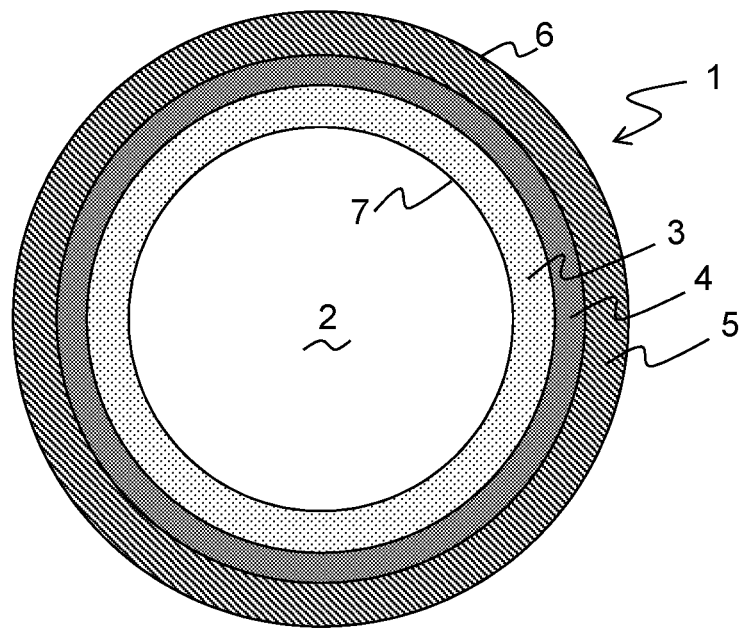

FLEXIBLE MULTILAYER COMPRESSED-AIR LINE

TECHNICAL FIELD

The present invention relates to a multilayer line of thermoplastic material, especially for compressed air in the automotive sector, to a method for producing such a line, and to uses of such lines.

PRIOR ART

The use of compressed-air lines based on layer structures made of plastics, especially of polyamide, has already been state of the art for some considerable time. Because of the requirements relating to bursting pressure strength, not least at high temperature, and also of the requisite mechanical properties (e.g. impact toughness, elongation at break), there is a preference here for using multilayer pipes which exhibit high thermal robustness, high stability of length, and high pressure resistance at a wide variety of different temperatures. EP-A-2 842 736 describes a compressed-air brake line which has an outer layer of at least 50% of PA11 or PA12 and comprises an inner layer composed of a moulding composition containing PA to an extent of at least 50%, the monomer units of this PA containing on average at least 8 carbon atoms, with PA11 and PA12 here being ruled out. A further, innermost layer may be provided, made from a moulding composition which contains, to an extent of at least 50%, PA whose monomer units contain on average at least 8 carbon atoms. As examples, the pipe construction from outside to inside PA12¦¦PA612¦¦PA12 was produced and the comparative stress, referred to as hoop strength or hoop stress, was measured.

Another compressed-air line is disclosed by EP-A-1 378 696. Here the intermediate layer is always either a mixture of a polyamide and a polyolefin, or based on copolymers with polyether blocks and polyamide blocks. Inner and outer layers are the same in design, being composed specifically of polyamide 11 or polyamide 12; likewise possible are polyamide 6 and polyamide 66 or other systems; mixtures are not proposed. No specific working examples are produced, there being, instead, only generic listings, meaning that the performance of the proposed structures cannot be reproduced.

EP-A-2 409 830 describes a flexible polyamide brake line. Generically, very different multilayer constructions are described. Outer layers always consist of a single polyamide, and inner layers are proposed, in the case of certain constructions of the same material as the outer layer, or of PA6 or PA66, and, in the case of other constructions of PA6, PA66, PA610, and also PA612. Mixtures are described only in connection with polyether-polyamide copolymers. Where further, intermediate layers are disclosed, they consist of EVOH, of propylene polymers, or of otherwise unspecified polymers.

The task for EP-A-1 717 022 is to provide a multilayer pipe for transporting vapour or liquids. In the most general sense, a two-layer line is claimed, composed of a single mandatory layer of, for example, polyamide 610, optionally mixed additionally with polyamide 11, with a further layer on the inside or outside. This additional layer consists exclusively of a polyamide, PA11 or PA12, optionally with additional additives; there are no other polyamides in this layer, however. The examples use two-layer lines, and, where three-layer lines are used, they always have a layer of polyamide 11 on the inside and on the outside, and the intermediate layer consists either of polyamide 610 or of a mixture of polyamide 610 and polyamide 11.

WO-A-2011/136869 describes single-layer and multi-layer lines made from various polyamides. The bursting pressure requirements here are fulfilled by means including fibre-reinforced layers. Three-layer constructions are presented here only with a layer of this kind comprising fibres, for example. No specific working examples are produced; instead, only generic listings are given, and hence the performance of the proposed structures cannot be reproduced.

There are also further constructions which combine polyamides with a second, non-polyamide thermoplastic, e.g. polyester (specifically polybutylene terephthalate). DE-A-4112662 describes a PA12¦¦PA12+polyester¦¦PA12 construction.

US2004/096615 discloses multilayer lines which have a construction with layers of PA6 and layers of the lactam 6 and lactam 12 based copolymer PA6/12.

EXPOSITION OF THE INVENTION

It is, inter alia, an object of the invention to provide a multilayer compressed-air line having very good bursting pressure and also low extraction in compliance with the corresponding standards. It is a further object of the invention to provide a mechanically robust line. The objects of the invention are achieved by the construction defined in claim 1.

Specifically the present invention relates to a plastics line consisting of three layers:
an inner layer bordering the interior,
a middle layer directly adjoining the inner layer, and
an outer layer directly adjoining the middle layer.

In this construction, the inner layer is formed on the basis of a mixture of at least two polyamides selected from the following group: PA12, PA612, PA616, or consists substantially thereof.

The middle layer is formed on the basis of PA612 and/or PA616 or consists substantially thereof.

The outer layer is formed on the basis of a mixture of at least two polyamides selected from the following group: PA12, PA612, PA616, or consists substantially thereof.

The polyamides PA612 and PA616 are always constructed as homopolymers composed of hexamethylenediamine and 1,12-dodecanedioic acid and, respectively, 1,16-hexadecanedioic acid (cf. also ISO 1874-1:1992(E) and also EN ISO 16396-1:2015). A first preferred embodiment of the proposed line is characterized in that the inner layer is formed on the basis of a mixture of PA12 and PA612 or consists substantially thereof.

A second preferred embodiment of the proposed line is characterized in that the outer layer is formed on the basis of a mixture of PA12 and PA612 or consists substantially thereof. For the first and second embodiments it is preferably the case that in each case the fraction of PA612 makes up at least 20 weight percent of the overall moulding composition of the respective layer, preferably in the range of 20-40 weight percent, especially preferably in the range of 25-35 weight percent.

A further preferred embodiment of the present plastics line is characterized in that both the inner layer and the outer layer are formed on the basis of a mixture of PA12 and PA612 or consist substantially thereof, where in each case the fraction of PA612 makes up at least 20 weight percent of the overall moulding composition of the respective layer, preferably in the range of 20-40 weight percent, especially preferably in the range of 25-35 weight percent.

The middle layer is preferably formed only on the basis of PA612, without further polyamide constituents.

When it is said here that a certain layer is formed "on the basis of polyamide xx", this preferably means that the moulding composition apart from the stated polyamide xx contains no further polyamide constituents other than polyamide xx.

The moulding composition of the inner layer, of the outer layer, preferably of inner layer and outer layer, consists preferably of the following constituents:

(A) 78-96 weight percent, preferably 85-95 weight percent, of a mixture of at least two polyamides selected from the following group: PA12, PA612, PA616;
(B) 2-20 weight percent, preferably 2-8 weight percent, especially preferably 3-6 weight percent of impact modifier;
(C) 2-15 weight percent, preferably 4-10 weight percent, especially preferably 5-7 weight percent of plasticizer;
(D) 0-5 weight percent of additives other than (B) and (C), where the sum of (A)-(D) makes up 100 weight percent of the overall moulding composition forming each layer.

The moulding compositions of inner layer and outer layer are preferably identical or quasi-identical.

The composition of component (A) is preferably as follows:

(A1) 50-90 weight percent, preferably 60-72 weight percent of polyamide PA12;
(A2) 10-50 weight percent, preferably 28-40 weight percent of polyamide PA612;
where the sum of (A1)-(A2) makes up 100 weight percent of component (A).

Alternatively or additionally it is the case, moreover, that component (A) consists of a mixture of polyamide PA12 and polyamide PA612, where the ratio is in the range of 1:1-5:1, especially preferably in the 1.2:1-4:1 range.

The moulding composition of the middle layer consists preferentially of the following constituents:
(a) 60-92 weight percent, preferably 70-90 or 72-90 weight percent, of at least one polyamide selected from the following group: PA612, PA616, where polyamide 612 alone is preferred;
(b) 5-25 weight percent, preferably 10-20 weight percent, especially preferably 12-18 weight percent of impact modifier;
(c) 3-18 weight percent, preferably 4-14 weight percent, especially preferably 7-11 weight percent of plasticizer;
(d) 0-5 weight percent of additives other than (b) and (c), where the sum of (a)-(d) makes up 100 weight percent.

The polyamide or the polyamides of at least one layer, preferably the polyamides of all the layers, preferably have a relative solution viscosity, measured in m-cresol according to ISO 307 at a temperature of 20° C., in the range of 2.0-2.4, preferably of 2.05-2.35.

With further preference they possess a melting point in the range of 160-240° C. or 175-220° C., preferably, when selected as polyamide PA12, a melting point in the range of 175-180° C. and, when selected as polyamide PA612, a melting point in the range of 210-215° C.

The fraction of additives (D, d) is preferably in the range of 0.1-3 weight percent, preferably in the range of 0.5-1 weight percent.

Preferentially the additives (D, d) are selected from at least one adjuvant of the following group: antioxidants, processing assistants, UV stabilizers, heat stabilizers, pigments, masterbatch vehicles, conductivity additives, lubricants or mixtures thereof.

A preferred stabilizer is the combination of copper(I) iodide and potassium iodide/calcium stearate. In another embodiment the use of an organic stabilizer is preferred. In a further preferred embodiment the inner layer comprises a copper stabilization and the outer layer an organic stabilization.

At least one the of layers, preferably all the layers, preferentially possess, in the context of additives, a copper stabilization, preferably based on CuI, in a CuI fraction in the range of 0.01-0.10 weight percent, or in a fraction of 0.03-0.07 weight percent on the overall moulding composition of the respective layer.

A further preferred embodiment is characterized in that the impact modifier (B, b) is an acid-modified ethylene-α-olefin copolymer, especially preferably an ethylene/α-olefin copolymer grafted with an acid anhydride, more particularly with maleic anhydride, more particularly thus-modified or thus-grafted ethylene/butylene, ethylene/propylene, or ethylene-propylene/ethylene-butylene copolymer and also mixtures thereof. It is further preferred if the plasticizer (C, c) is selected as hydroxybenzoic ester-based and/or sulfonamide-based plasticizer, preferably of the class of the N-substituted sulfonamide plasticizers, especially preferably as BBSA.

Suitable hydroxybenzoic ester-based plasticizers include, for example, systems as follows: hexyloxyethoxyethyl p-hydroxybenzoate; hexyl oxypropoxypropyl p-hydroxybenzoate; hexyloxybutoxybutyl p-hydroxybenzoate; octyloxyethoxyethyl p-hydroxybenzoate; octyloxypropoxypropyl p-hydroxybenzoate; octyloxybutoxybutyl p-hydroxybenzoate; 2'-ethylhexyloxyethoxyethyl p-hydroxybenzoate; 2'-ethylhexyloxypropoxypropyl p-hydroxybenzoate; 2'-ethylhexyloxybutoxybutyl p-hydroxybenzoate; decyloxyethoxyethyl p-hydroxybenzoate; decyloxypropoxypropyl p-hydroxybenzoate; decyloxybutoxybutyl p-hydroxybenzoate, or mixtures thereof.

The present invention further relates to a method for producing a plastics line as set out above, preferably characterized in that the 3 layers are formed in a continuous and/or discontinuous operation, preferably in an extrusion blow moulding, a tandem extrusion, a sheathing process or a (co)extrusion operation, into a hollow body, especially preferably into a pipe or a line or a container.

Lastly the present invention relates to the use of such a plastics line as a pressure line, especially as a compressed-air line, preferably in the automotive sector, especially preferably as a compressed-air brake line in the automotive sector, preferably under conditions with an internal pressure of up to 100 bar, especially preferably of up to 90 bar, and particularly preferably in the range of 80-100 bar.

Further embodiments are indicated in the dependent claims.

BRIEF DESCRIPTION OF THE DRAWINGS

Preferred embodiments of the invention are described hereinafter with reference to the drawings, which serve merely for elucidation and should not be interpreted as imposing any limitation. In the drawings:

FIG. 1 shows a compressed-air line in a sectional representation perpendicular to the path direction.

DESCRIPTION OF PREFERRED EMBODIMENTS

FIG. 1 shows an exemplary compressed-air line 1 according to the invention in a section transverse to the main path direction.

The cross-sectional area may be constant over the main path direction; in other words, the pipe may have a substantially hollow-cylindrical shape.

The cross-sectional area may alternatively vary over the main path direction, in the form of a corrugated pipe, for example.

An interior 2 is enclosed by the pipe wall. Radially outwards, the interior 2 is followed first by an inner layer 3, which with the inside face 7 adjoins the interior 2 and confines it. This inner layer is formed on the basis of a mixture of polyamide 12 and polyamide 612, without further, different polyamide constituents.

Directly adjoining the inner layer 3, without a layer of adhesion promoter in-between, there follows a middle layer 4, which is formed on the basis of polyamide 612 without further, different polyamide constituents.

Directly adjoining this middle layer 4, outwardly, and again without a layer of adhesion promoter in-between, there follows the outer layer 5. The outer layer 5 is formed on the basis of a mixture of polyamide 12 and polyamide 612, without further, different polyamide constituents. The outside face 6 of the outer layer 5 confines the line outwardly.

Starting Materials Used:

PA12 high-viscosity polyamide 12 with $T_m$=178° C. measured according to ISO 3146 and $\eta_{rel}$=2.25, measured as 0.5 g of polyamide in solution in 100 mL of m-cresol.

PA612 polyamide 612 with $T_m$=215° C. measured according to ISO 3146 and $\eta_{rel}$=2.15, measured as 0.5 g of polyamide in solution in 100 mL of m-cresol.

TABLE 1

Properties of the moulding compositions used in Example 1 (dry)

| Properties | Unit | Inner and outer layer | Middle layer |
|---|---|---|---|
| Modulus of elasticity | MPa | 1000 | 700 |
| Breaking stress | MPa | 45 | 50 |
| Elongation at break | % | 200 | 200 |
| Melting point | ° C. | 173 | 210 |

Production of Test Specimens:

Pipes were coextruded at melt temperatures between 240 and 260° C. under reduced pressure of −140 mbar with an extrusion rate of 16 m/min. Test specimens used were pipes having an external diameter of 12 mm, the wall thickness being 1.5 mm.

Testing was carried out in each case five times on specimens with an outer diameter of 12 mm.

The length of the pipe was adapted according to the testing requirements.

Construction of the Pipes for the Measurements:

The three layers are constructed as follows: outer layer 0.15 mm; middle layer 1.2 mm; inner layer 0.15 mm, with a total wall thickness of 1.5 mm.

TABLE 2

Compositions of the test pipes

| | | E1 | | CE1 | | CE2 | | CE3 | |
|---|---|---|---|---|---|---|---|---|---|
| | | O/I | M | O/I | M | O/I | M | O/I | M |
| PA12 | wt % | 60 | | 90 | | 45 | | 75 | |
| PA612 | wt % | 30 | 75 | 0 | 75 | 45 | 75 | 15 | 75 |
| WM | wt % | 6 | 9 | 6 | 9 | 6 | 9 | 6 | 9 |
| SZM | wt % | 3 | 15 | 3 | 15 | 3 | 15 | 3 | 15 |
| Stab | wt % | 0.35 | 0.35 | 0.35 | 0.35 | 0.35 | 0.35 | 0.35 | 0.35 |
| SMB | wt % | 0.65 | 0.65 | 0.65 | 0.65 | 0.65 | 0.65 | 0.65 | 0.65 |
| % PA 612 | wt % | 33.3 | | 0.0 | | 50.0 | | 16.7 | |
| % PA12 | wt % | 66.7 | | 100.0 | | 50.0 | | 83.3 | |
| Ratio PA12:PA612 | | 2.0 | | 0.0 | | 1.0 | | 5.0 | |

M: middle layer;
O/I: outer and inner layer

WM plasticizer, N-butylbenzenesulfonamide (BBSA), available from Lanxess under the brand name Uniplex 214.

SZM Tafmer MC201 available from Mitsui Chemicals, MVR (measured at 230° C./2.16 kg) of 1.2 g/10 min (ASTM D1238) and with $T_g$ measured according to ISO 11357-2 (2013) of −60° C. Tafmer MC-201 is an impact modifier in the form of a mixture of ethylene-propylene and ethylene-butylene copolymers grafted with maleic anhydride, namely g-MAH (−0.6%) blend of 67% EP copolymer (20 mol % propylene)+33% EB copolymer (15 mol % 1-butene).

Stab Copper(I) iodide, calcium stearate, potassium iodide, in ratio of 8:1:49.

SMB Euthylen Black, carbon black-based (40%) colour masterbatch based on PE, available from BASF (Ludwigshafen, Del.).

Tests Conducted on the Materials and the Pipe Constructions Described were as Follows:

Unless otherwise indicated or mandated by the standard, the measurements were carried out at 50% relative humidity.

Extractable Fraction:

Testing according to DIN 73378 (1996), Section 6.4.4: The test takes place according to DIN 53738 over an extraction time of (18±1) h with method A. The pipe samples are comminuted using a comminutor. Extraction takes place utilizing a pellet fraction which is limited by the wire sieves 500 μm and 3.15 mm according to DIN ISO 3310-1. The extraction liquid used is ethanol.

Breaking Stress, Elongation at Break (50 mm/Min) and Modulus of Elasticity (1 mm/Min) Measured on the Moulding Compositions:

Measured according to ISO 527 (2012) with a tensioning speed of 1 mm/min on a tensile bar conforming to ISO 3167.

Pendulum Impact:

Testing according to DIN 73378 (1996) Section 6.4.6.

Comparative Stress:

The bursting pressure of the mouldings produced is measured in a method based on DIN 73378 (1996) on hollow bodies with dimensions of 15 cm length and 12 mm external diameter, and 1.5 mm wall thickness. The comparative stress, as a materials characteristic independent of the pipe compositions, is computed from the bursting pressure of the pipe, determined under internal pressure stressing, using equation (1) in DIN 73378 (1996) Section 3.2.

Relative Viscosity:

DIN EN ISO 307 (2007), in 0.5 wt % strength m-cresol solution at a temperature of 20° C.

Thermal Behaviour:

melting point $T_m$, enthalpy of fusion and glass transition temperature ($T_g$): ISO standard 11357-1 (2016), -2 (2013) and -3 (2011), pellets; the Differential Scanning Calorimetry (DSC) is carried out with heating rate of 20° C./min.

TABLE 3

| Properties | | E1 | CE1 | CE2 | CE3 |
|---|---|---|---|---|---|
| Extractable fraction | % | 8.8 | 9.7 | 9.6 | 9.2 |
| Comparative stress | 23° C. MPa | 32 | 27 | 28 | 29 |
| Comparative stress | 80° C. MPa | 16 | 14 | 15 | 14 |
| Comparative stress | 100° C. MPa | 14 | 12 | 12 | 11 |
| Comparative stress | 130° C. MPa | 10 | 9 | 9 | 8 |
| Pendulum impact | −40 ± 2° C. | No f. | No f. | No f. | No f. |

No f. = no fracture

The present results show a surprising effect from the addition of PA612 to the moulding composition for the inner and outer layers of the compressed-air brake line. Unexpectedly, besides adequate pendulum impact, an improvement is observed in the comparative stress and a decrease in the extraction. On the basis of the experimental evidence, therefore, it is possible to show that a mixture of PA612 and PA12 provides optimized mechanical properties as well as an improvement in the amount of extractable fractions of the line.

| LIST OF REFERENCE NUMERALS | |
|---|---|
| 1 | Compressed-air line |
| 2 | Interior |
| 3 | Inner layer |
| 4 | Middle layer |
| 5 | Outer layer |
| 6 | Outside face |
| 7 | Inside face |

The invention claimed is:

1. A plastics line consisting of three layers, an inner layer bordering an interior, a middle layer directly adjoining the inner layer, and an outer layer directly adjoining the middle layer,
    wherein the inner layer is formed on the basis of a mixture of at least two polyamides selected from the following group: PA12, PA612, PA616, or consists substantially thereof, wherein the fraction of PA612 is in the range of 20-40 weight percent of the moulding composition forming the inner layer,
    wherein the middle layer is formed on the basis of PA612 and/or PA616 or consists substantially thereof, and
    wherein the outer layer is formed on the basis of a mixture of at least two polyamides selected from the following group: PA12, PA612, PA616, or consists substantially thereof, wherein the fraction of PA612 is in the range of 20-40 weight percent of the moulding composition forming the inner layer.

2. The plastics line according to claim 1, wherein the inner layer is formed on the basis of a mixture of PA12 and PA612 or consists substantially thereof, where the fraction of PA612 makes up at least 20 weight percent of the overall moulding composition of the respective layer.

3. The plastics line according to claim 1, wherein the outer layer is formed on the basis of a mixture of PA12 and PA612 or consists substantially thereof, wherein the fraction of PA612 makes up at least 20 weight percent of the overall moulding composition of the respective layer.

4. The plastics line according to claim 1, wherein both the inner layer and the outer layer are formed on the basis of a mixture of PA12 and PA612 or consist substantially thereof, wherein in each case the fraction of PA612 makes up at least 20 weight percent of the overall moulding composition of the respective layer.

5. The plastics line according to claim 1, wherein the moulding composition of the middle layer consists of the following constituents:
    (a) 60-92 weight percent, of a polyamide selected from the following group: PA612, PA616;
    (b) 5-25 weight percent, of impact modifier;
    (c) 3-18 weight percent of plasticizer; and
    (d) 0-5 weight percent of additives other than (b) and (c), where the sum of (a)-(d) makes up 100 weight percent.

6. The plastics line according to claim 1, wherein the polyamide or the polyamides of at least one layer have a relative solution viscosity, measured in m-cresol according to ISO 307 at a temperature of 20° C., in the range of 2.0-2.4.

7. The plastics line according to claim 1, wherein the polyamide or the polyamides of at least one layer have a melting point in the range of 160–240° C.

8. The plastics line according to claim 1, wherein the inner layer is formed on the basis of a mixture of PA12 and PA612 or consists substantially thereof, where the fraction of PA612 makes up in the range of 25-35 weight percent of the overall moulding composition of the respective layer.

9. The plastics line according to claim 1, wherein the outer layer is formed on the basis of a mixture of PA12 and PA612 or consists substantially thereof, where the fraction of PA612 makes up in the range of 25-35 weight percent of the overall moulding composition of the respective layer.

10. The plastics line according to claim 1, wherein both the inner layer and the outer layer are formed on the basis of a mixture of PA12 and PA612 or consist substantially thereof, where in each case the fraction of PA612 makes up 25-35 weight percent of the overall moulding composition of the respective layer.

11. The plastics line according to claim 1, wherein the moulding composition of the inner layer, the outer layer or both layers, consists of the following constituents:
    (A) 85-95 weight percent, of a mixture of at least two polyamides selected from the following group: PA12, PA612, PA616;
    (B) 3-6 weight percent of impact modifier;
    (C) 5-7 weight percent of plasticizer;
    (D) 0-5 weight percent of additives other than (B) and (C), where the sum of (A)-(D) makes up 100 weight percent.

12. The plastics line according to claim 1, wherein the moulding composition of the middle layer consists of the following constituents:
    (a) 72-90 weight percent, of a polyamide selected from the following group: PA612, PA616;
    (b) 12-18 weight percent of impact modifier;

(c) 7-11 weight percent of plasticizer;
(d) 0-5 weight percent of additives other than (b) and (c), where the sum of (a)-(d) makes up 100 weight percent.

13. The plastics line according to claim 1, wherein at least one of the layers, or all the layers, in the context of additives (D) have a copper stabilization, based on CuI, in a CuI fraction in the range of 0.01-0.10 weight percent, or in a fraction of 0.03-0.07 weight percent on the overall moulding composition of the respective layer.

14. The plastics line according to claim 1, wherein the polyamide or the polyamides of at least one layer, or the polyamides of all the layers, have a relative solution viscosity, measured in m-cresol according to ISO 307 at a temperature of 20° C., in the range of 2.05-2.35.

15. The plastics line according to claim 1, wherein the polyamide or the polyamides of at least one layer have a melting point in the range of 175-220° C.

16. The plastics line according to claim 1, wherein the polyamide or the polyamides of at least one layer have a melting point, when selected as polyamide PA12, in the range of 175-180° C. and, when selected as polyamide PA612, in the range of 210-215° C.

17. A method for producing a plastics line according to claim 1, wherein the 3 layers are formed in a continuous and/or discontinuous operation, in an extrusion blow moulding, a tandem extrusion, a sheathing process or a (co) extrusion operation, into a pipe or a line or a container.

18. A method of using the plastics line according to claim 1 as a compressed-air line, in the automotive sector, including as a compressed-air brake line in the automotive sector, under conditions with an internal pressure of up to 100 bar, or of up to 90 bar, or in the range of 80-100 bar.

19. The plastics line according to claim 1, wherein the moulding composition of the inner layer, of the outer layer, or of both layers, consists of the following constituents:
(A) 78-96 weight percent, of a mixture of at least two polyamides selected from the following group: PA12, PA612, PA616;
(B) 2-20 weight percent of impact modifier;
(C) 2-15 weight percent of plasticizer; and
(D) 0-5 weight percent of additives other than (B) and (C), where the sum of (A)-(D) makes up 100 weight percent.

20. The plastics line according to claim 19, wherein the composition of component (A) is as follows:
(A1) 50-90 weight percent of polyamide PA12; and
(A2) 10-50 weight percent of polyamide PA612;
where the sum of (A1)-(A2) makes up 100 weight percent of component (A),
or wherein component (A) consists of a mixture of polyamide PA12 and polyamide PA612, where the ratio is in the range of 1:1-5:1.

21. The plastics line according to claim 19, wherein the fraction of additives (D) is in the range of 0.1-3 weight percent,
or wherein additives (D) are selected from at least one adjuvant of the following group: antioxidants, processing assistants, UV stabilizers, heat stabilizers, pigments, masterbatch vehicles, conductivity additives, lubricants or mixtures thereof.

22. The plastics line according to claim 19, wherein the impact modifier (B) is an acid-modified ethylene-α-olefin copolymer and also mixtures thereof.

23. The plastics line according to claim 19, wherein the plasticizer (C) is selected as hydroxybenzoic ester-based or sulfonamide-based plasticizer or a mixture thereof.

24. The plastics line according to claim 19, wherein at least one of the layers, or all the layers, in the context of additives (D) have a copper stabilization.

25. The plastics line according to claim 19, wherein the composition of component (A) is as follows:
(A1) 60-72 weight percent of polyamide PA12;
(A2) 28-40 weight percent of polyamide PA612;
where the sum of (A1)-(A2) makes up 100 weight percent of component (A),
or in that component (A) consists of a mixture of polyamide PA12 and polyamide PA612, where the ratio is in the range of 1.2:1-4:1.

26. The plastics line according to claim 19, wherein the fraction of additives (D) is in the range 0.5-1 weight percent.

27. The plastics line according to claim 19, wherein the impact modifier (B) is an ethylene/α-olefin copolymer grafted with an acid anhydride.

28. The plastics line according to claim 19, wherein the impact modifier (B) is an ethylene/α-olefin copolymer grafted with maleic anhydride.

29. The plastics line according to claim 19, wherein the impact modifier (B) is an ethylene/butylene, ethylene/propylene, or ethylene-propylene/ethylene-butylene copolymer grafted with maleic anhydride and also mixtures thereof.

30. The plastics line according to claim 19, wherein the plasticizer (C) is selected of the class of the N-substituted sulfonamide plasticizers including BBSA.

31. A method for producing the plastics line according to claim 1, wherein the 3 layers are formed in a continuous or discontinuous operation.

32. A method of using a plastics line according to claim 1 as a pressure line.

* * * * *